(12) United States Patent
Middleton et al.

(10) Patent No.: US 8,842,992 B2
(45) Date of Patent: Sep. 23, 2014

(54) ELECTRO-OPTIC COMMUNICATIONS DEVICE WITH FREQUENCY CONVERSION AND RELATED METHODS

(75) Inventors: Charles Middleton, Rockledge, FL (US); Richard DeSalvo, Satellite Beach, FL (US); Peter S. Scheuter, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 352 days.

(21) Appl. No.: 13/414,237

(22) Filed: Mar. 7, 2012

(65) Prior Publication Data

US 2013/0236187 A1 Sep. 12, 2013

(51) Int. Cl.
*H04B 10/14* (2006.01)
*H04B 10/18* (2006.01)

(52) U.S. Cl.
USPC ........... 398/115; 398/116; 398/200; 398/208; 398/188; 398/185

(58) Field of Classification Search
CPC ....................... H04B 10/25759; H04B 10/2575
See application file for complete search history.

(56) References Cited

U.S. PATENT DOCUMENTS

| | | | |
|---|---|---|---|
| 4,045,120 A * | 8/1977 | de Corlieu et al. ............. | 385/31 |
| 5,710,651 A | 1/1998 | Logan, Jr. | |
| 5,859,611 A | 1/1999 | Lam et al. | |
| 6,256,130 B1 | 7/2001 | Bulow | |
| 2010/0111304 A1* | 5/2010 | Bloch et al. .................... | 380/256 |
| 2010/0111545 A1* | 5/2010 | Banwell et al. ............... | 398/208 |

OTHER PUBLICATIONS

Karim et al., "High Dynamic Range Microwave Photonic Links for RF Signal Transport and RF-IF Conversion," Journal of Lightwave Technology, vol. 26, No. 15, Aug. 1, 2008, pp. 2718-2724.
Clark et al., "A Phase-Modulation I/Q-Demodulation Microwave-to-Digital Photonic Link," IEEE Transactions on Microwave Theory and Techniques, vol. 58, No. 11, Nov. 2010, pp. 3039-3058.

* cited by examiner

*Primary Examiner* — Commen Jacob
(74) *Attorney, Agent, or Firm* — Allen, Dyer, Doppelt, Milbrath & Gilchrist, P.A.

(57) ABSTRACT

A communications device includes a transmitter device having an optical source configured to generate an optical carrier signal, a first E/O modulator coupled to the optical source and configured to modulate the optical carrier signal with an input signal having a first frequency, and a second E/O modulator coupled to the optical source and configured to modulate the optical carrier signal with a reference signal. The communications device includes an optical waveguide coupled to the transmitter device, and a receiver device coupled to the optical waveguide and including an O/E converter coupled to the optical waveguide and configured to generate an output signal comprising a replica of the input signal at a second frequency based upon the reference signal.

20 Claims, 9 Drawing Sheets

ELECTRO-OPTIC COMMUNICATIONS DEVICE WITH FREQUENCY CONVERSION AND RELATED METHODS

FIELD OF THE INVENTION

The present invention relates to the field of communications, and, more particularly, to radio frequency (RF) communications and related methods.

BACKGROUND OF THE INVENTION

A typical wireless communication system comprises a plurality of wireless communications devices exchanging data with each other. In some wireless communication systems, for example, infrastructure networks, the system may further comprise a wireless base station for managing communications between the wireless communications devices. In other words, each intra-system communication would be exchanged via the wireless base station. In other wireless communication systems, for example, mesh networks and ad hoc wireless networks, the wireless base station may be omitted, i.e. the wireless communications devices may communicate directly with each other.

A typical Extremely High Frequency (EHF), i.e. 30 to 300 GHz, communication system operating at this band may have some drawbacks. For example, transmission of the signals over coaxial cable may incur large attenuation effects. Moreover, in applications where RF devices are used, the size, weight, and power (SWaP) of the components may increase to undesirable levels. Moreover, downstream receiver processing, such as downconverting, and signal addressing may be difficult.

One approach to these drawbacks in EHF communication systems may comprise the use of optical components for processing components. An advantage of such systems is the ability to transmit EHF signals from a remote location without the degradation of the signal incumbent in RF applications.

For example, as disclosed in U.S. Pat. No. 5,710,651 to Logan, Jr., an EHF communication system comprises a remote antenna station, a transmitter/receiver station, and an optical fiber coupling the stations together. These stations comprise photodiodes for converting the transmitted optical signal to an electrical signal, and lasers paired with optical modulators for converting the received EHF signal to an optical signal.

Nevertheless, optical applications such as this may be subject to certain drawbacks. For example, the systems may be subject to chromatic dispersion-induced signal fading. In particular, optical heterodyne approaches may be limited by phase noise of laser sources.

SUMMARY OF THE INVENTION

In view of the foregoing background, it is therefore an object of the present invention to provide a communications device that efficiently operates on RF signals, such as in the EHF band.

This and other objects, features, and advantages in accordance with the present invention are provided by a communications device comprising a transmitter device comprising an optical source configured to generate an optical carrier signal, a first electro-optic (E/O) modulator coupled to the optical source and configured to modulate the optical carrier signal with an input signal having a first frequency, and a second E/O modulator coupled to the optical source and configured to modulate the optical carrier signal with a reference signal (e.g. local oscillator signal). The communications device includes an optical waveguide coupled to the transmitter device, and a receiver device coupled to the optical waveguide and comprising an O/E converter coupled to the optical waveguide and configured to generate an output signal comprising a replica of the input signal at a second frequency based upon the reference signal. The first frequency may be less than the second frequency, or the first frequency may be greater than the second frequency. Advantageously, the communications device may improve dynamic range and reduce noise.

Another aspect is directed to a communications method comprising generating an optical carrier signal in a transmitter device, and E/O modulating the optical carrier signal with an input signal having a first frequency in the transmitter device. The method also includes E/O modulating the optical carrier signal with a reference signal in the transmitter device, and generating an electrical output signal comprising a replica of the input signal at a second frequency based upon the reference signal at a receiver device coupled to the transmitter device via an optical waveguide.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
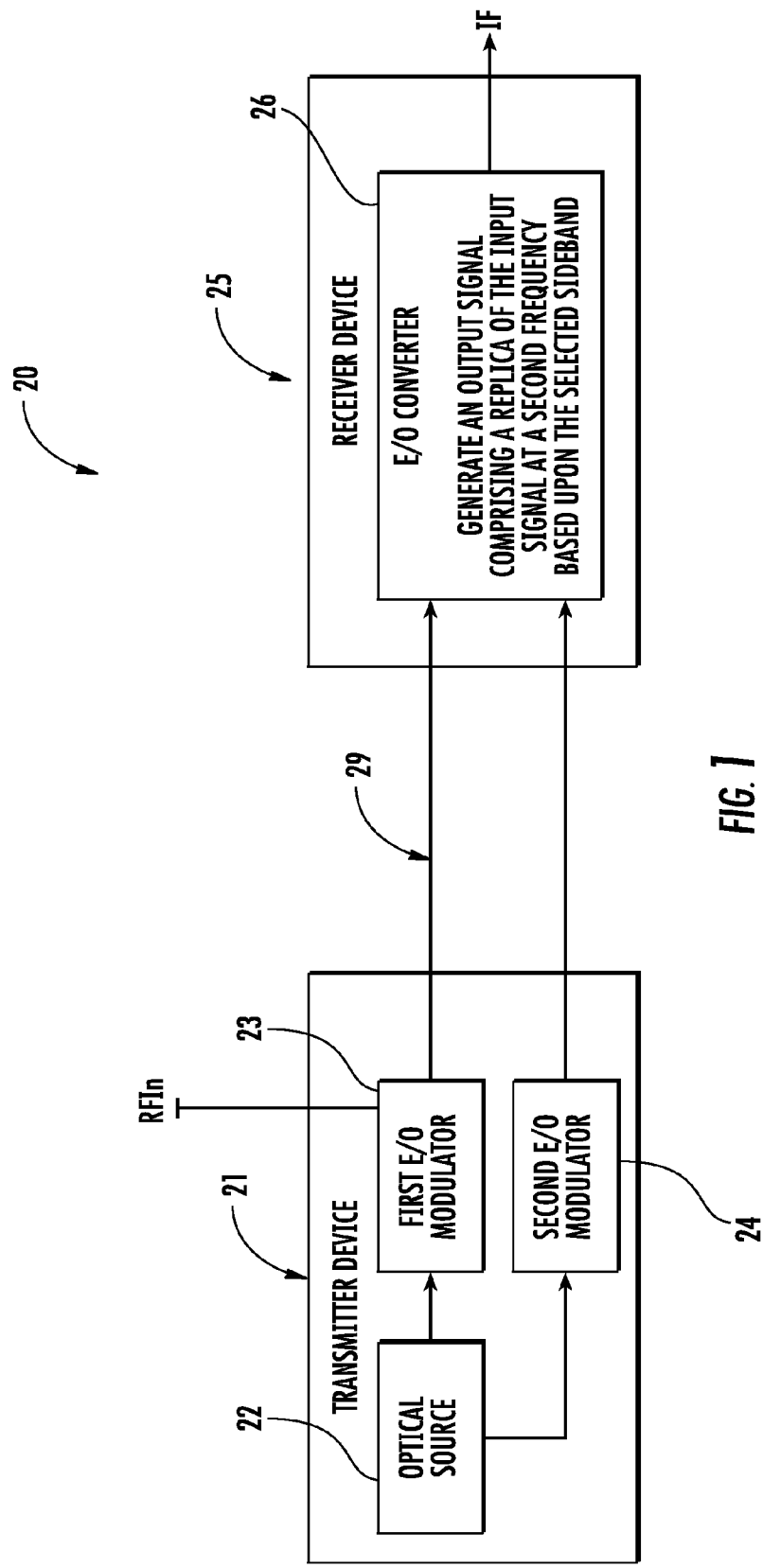
FIG. 1 is a schematic diagram of a communications device, according to the present invention.

Referring initially to FIG. 1, a communications device 20 according to the present invention is now described. The communications device 20 includes a transmitter device 21 comprising an optical source 22 (e.g. laser, LED) generating an optical carrier signal, a first E/O modulator 23 coupled to the optical source and modulating the optical carrier signal with an input signal having a first frequency, and a second E/O modulator 24 coupled to the optical source and modulating the optical carrier signal with a reference signal. For example, the input signal may comprise a millimeter wave signal or a microwave signal.

The communications device includes an optical waveguide 29 coupled to the transmitter device 21, and a receiver device 25 coupled to the optical waveguide and comprising an O/E converter 26 coupled to the optical waveguide and generating an output signal comprising a replica of the input signal at a second frequency based upon the reference signal. The first frequency may be less than the second frequency, or the first frequency may be greater than the second frequency. In other words, the replica of the input signal may be upconverted or downconverted in frequency.

For example, the optical waveguide 29 may comprise a pair of polarization maintaining optical fibers. In the alternative, a pair of polarization stabilization blocks could be placed downstream from the first and second E/O modulators 23-24.

Figure 2:
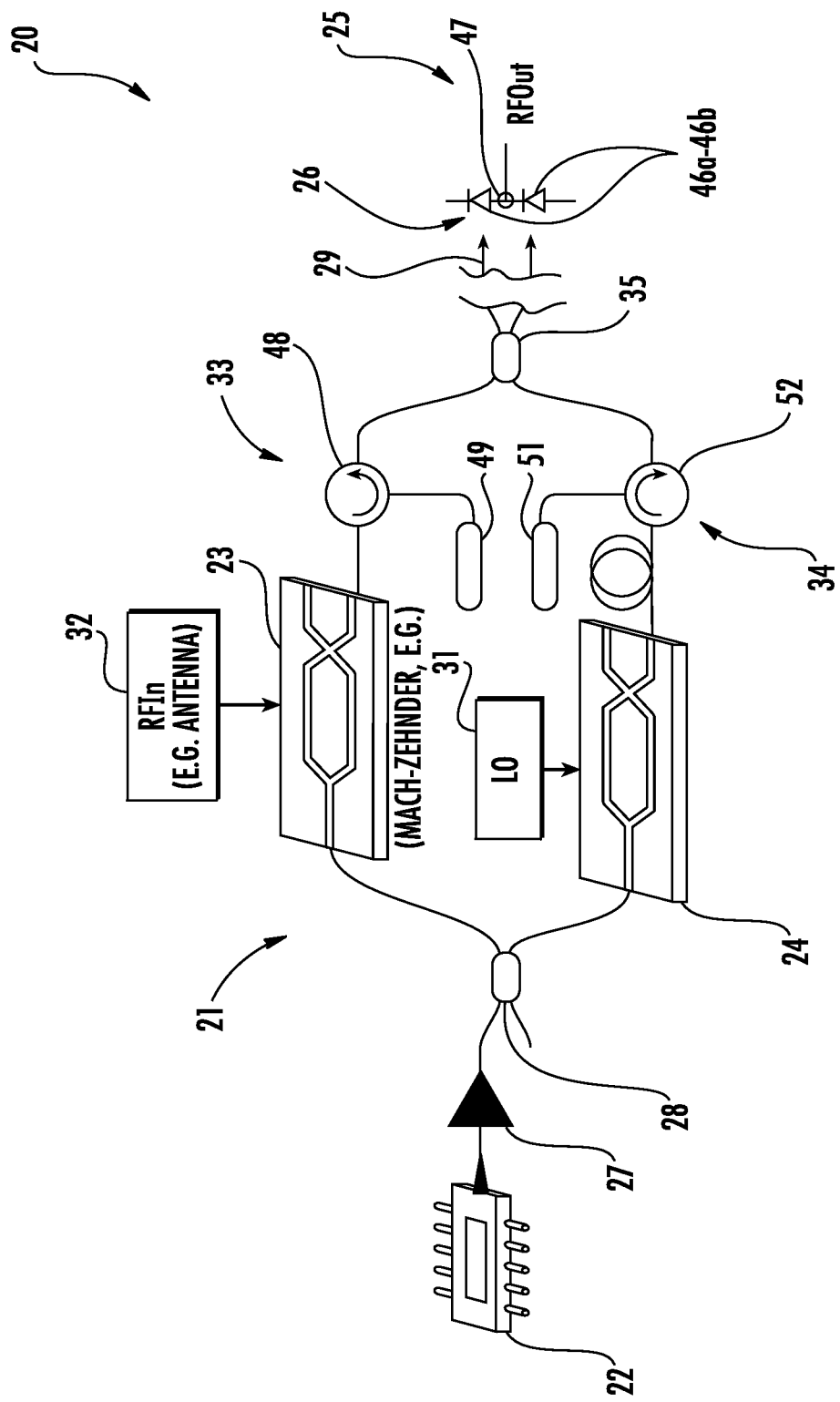
FIG. 2 is a detailed schematic diagram of a communications device, according to the present invention.

Referring now additionally to FIG. 2, the transmitter device 21 includes a first band pass filter 33 coupled downstream from the first E/O modulator 23 and passing (i.e. selecting and rejecting everything else) a carrier frequency sideband, and a second band pass filter 34 coupled downstream from the second E/O modulator 24 and passing a reference signal frequency sideband. The first and second band pass filters 33-34 each comprises a fiber Bragg grating 49, 51 and an associated circulator 48, 52.

In this embodiment, the O/E converter 26 comprises first and second optical detectors 46a-46b coupled to the optical waveguide 29, and a combiner 47 coupled to the first and second optical detectors. The transmitter device comprises an amplifier 27 coupled between the optical source 22 and the first and second E/O modulators 23-24.

Additionally, the transmitter device 21 further comprises an optical splitter 28 (shown as a directional coupler) coupled between the optical source 22 and the first and second E/O modulators 23-24, and an RF input block 32, such as antenna, coupled to the first E/O modulator. For example, each of the first and second E/O modulators 23-24 may comprise a Mach-Zehnder modulator. The transmitter device 21 also includes a local oscillator (LO) 31 for generating the reference signal, and a directional coupler 35 coupled between said first and second band pass filters 33-34 and the O/E converter 26. The LO 31 is selectively adjusted to control the frequency conversion of the output signal. Advantageously, in embodiments where the optical source 22 comprises a tunable laser, the band pass filters 33-34 can operate at a fixed IF, and frequency conversion can be tuned across a wide spectrum (limited only by the first and second E/O modulators 23-24 bandwidth, which may be over 100 GHz).

Correlation between the optical source signal paths may need to be maintained by using equal paths for the LO 31 and the RF input signal. The following formula summarizes this relation:

$$S_{\Delta\phi}(f) = 4\sin^2(\pi f \tau_d) \frac{S_{f,l}(f)}{f^2}$$

Indeed, differential path length variations can affect beat note phase stability, and the impact is evaluated, and can be managed in various ways.

Also, the length of the optical waveguide 29 may be several kilometers long, thereby being readily used in remoting applications. In remoting embodiments, the directional coupler 35 may comprise a 2×1 coupler (rather than the illustrated 2×2 coupler) since maintaining matching optical fiber lengths may be problematic. Of course, in these embodiments, the O/E converter 26 would comprise a single ended photodetector rather than the illustrated balanced photodiodes.

Another aspect is directed to a communications method comprising generating an optical carrier signal in a transmitter device 21, and E/O modulating the optical carrier signal with an input signal having a first frequency in the transmitter device. The method also includes E/O modulating the optical carrier signal with a reference signal in the transmitter device 21, and generating an electrical output signal comprising a replica of the input signal at a second frequency based upon the reference signal at a receiver device 25 coupled to the transmitter device 21 via an optical waveguide 29.

Figure 3A:
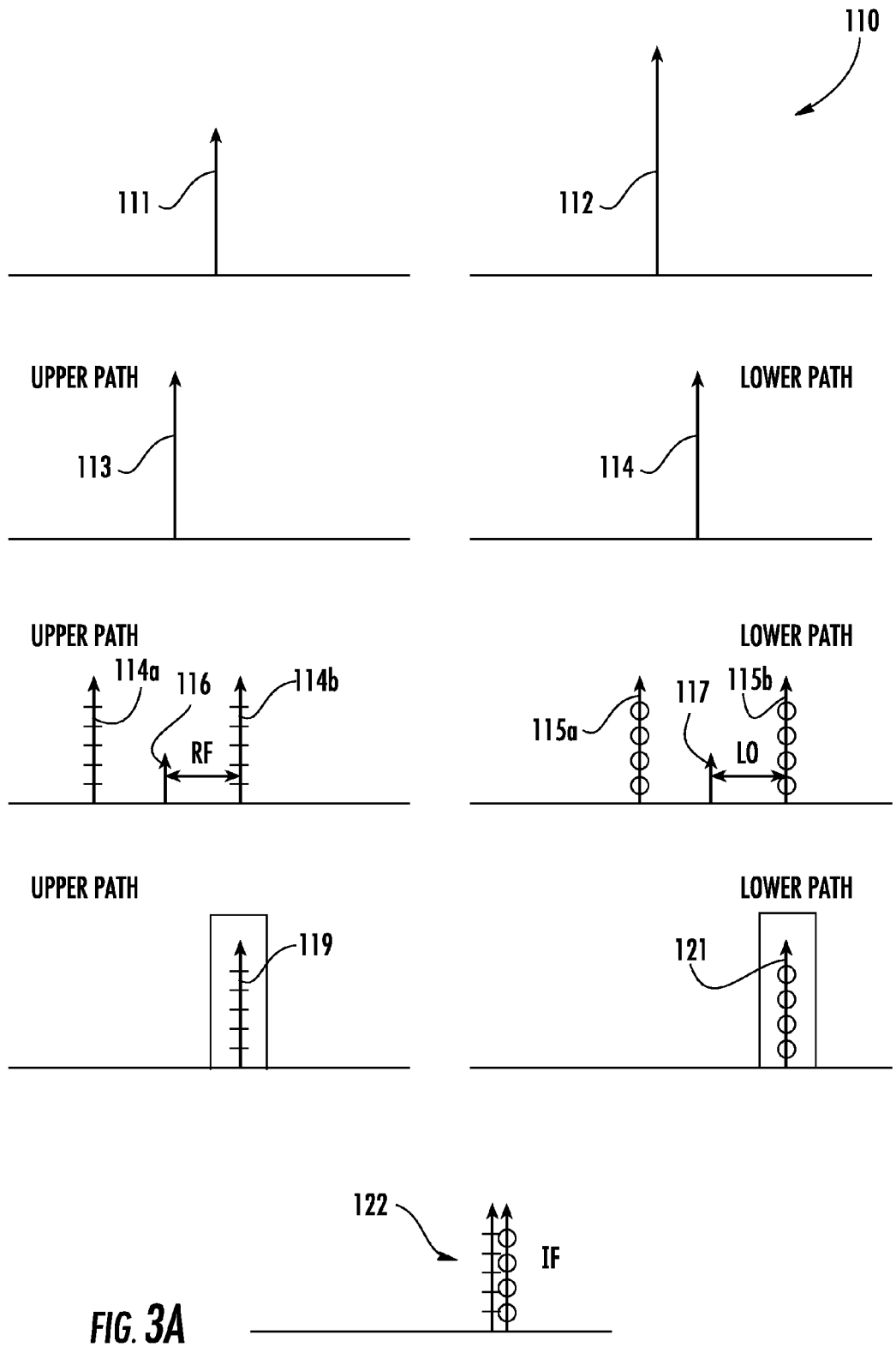
FIGS. 3A-3B are diagrams illustrating sideband filtering for downconverting and upconverting, respectively, in the communications device of FIG. 2.
Figure 3B:
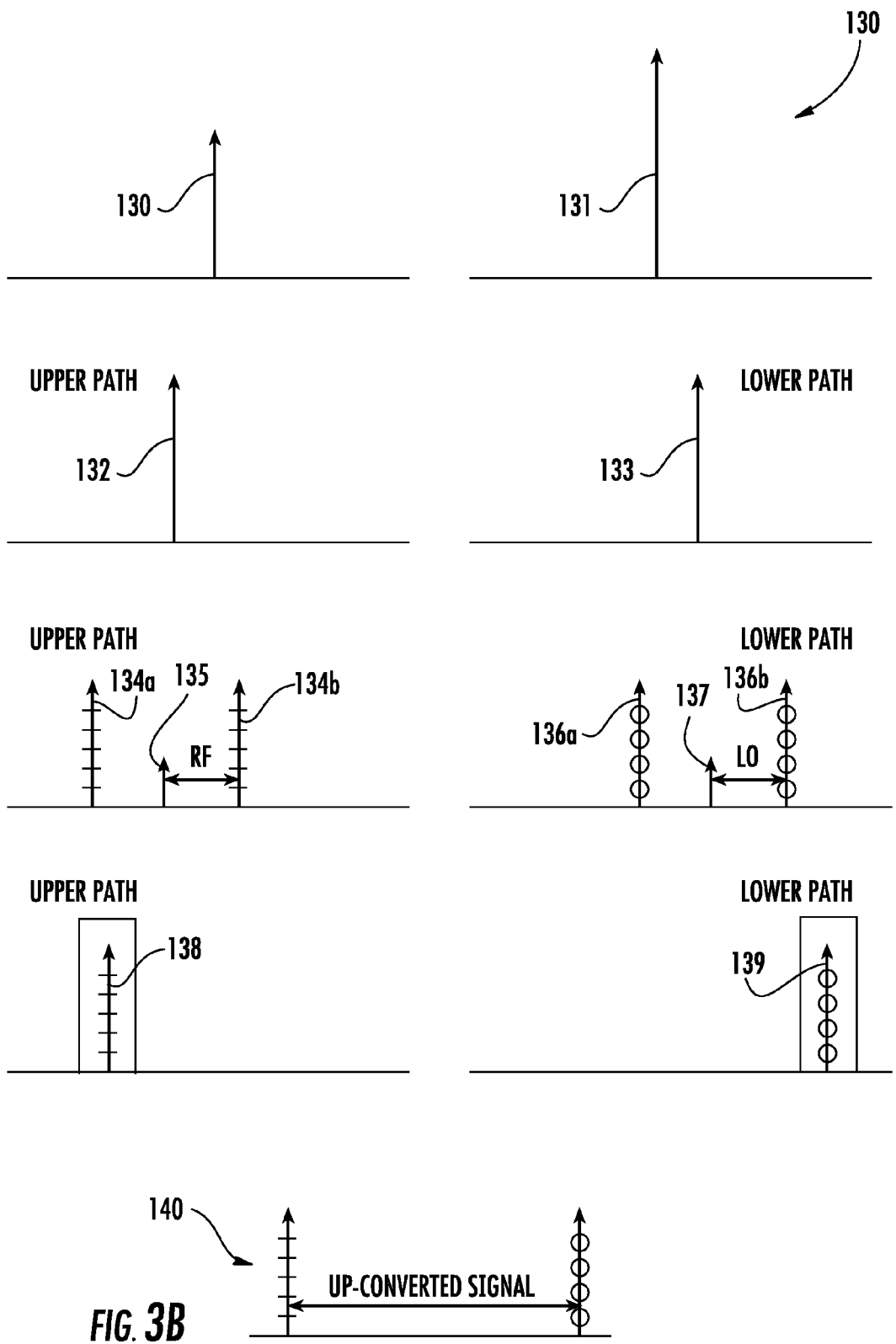
Figure 4:
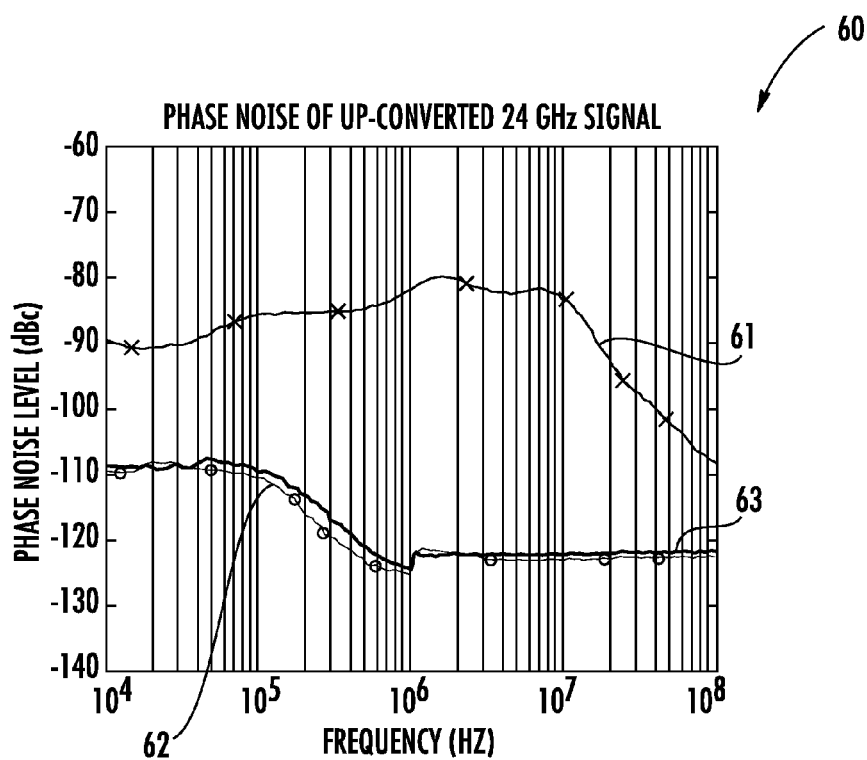
FIG. 4 is a diagram illustrating phase noise performance of an example embodiment of the communications device of FIG. 2.

Referring now to FIGS. 3A-3B, diagram 110 illustrates the sideband filtering to downconvert the input signal. In particular, the first and second E/O modulators 23, 24 are shown to pass one sideband of the local oscillator signal and one sideband of the RF signal. First, the optical carrier signal 111 is amplified into an amplified signal 112 with the amplifier 27. The amplified signal 112 is then split via the optical splitter 28 into an upper path signal 113 and a lower path signal 114. The first and second E/O modulators 23-24 modulate the RF signal 116 and the LO signal 117, respectively, and create respective sidebands 114a-114b, 115a-115b. The first and second band pass filters 33-34 then pass selected sidebands 119, 121, which are then combined into the frequency converted signal 122.

Diagram 130 illustrates the sideband filtering to upconvert the input signal. In particular, the first and second E/O modulators 23, 24 are shown to pass one sideband of the local oscillator signal and one sideband of the RF signal. First, the optical carrier signal 130 is amplified into an amplified signal 131 with the amplifier 27. The amplified signal 131 is then split via the optical splitter 28 into an upper path signal 132 and a lower path signal 133. The first and second E/O modulators 23-24 modulate the RF signal 135 and the LO signal 137, respectively, and create respective sidebands 134a-134b, 136a-136b. The first and second band pass filters 33-34 then pass selected sidebands 138, 139, which are then combined into the frequency converted signal 140.

Referring additionally to FIGS. 4-12, as will be appreciated by those skilled in the art, the communications device 20 embodiment of FIG. 2 is now discussed.

Photonic Frequency Conversion

Light from a continuous wave (CW) laser source 22 is amplified and split into two paths. On the upper path, the light is modulated by the RF or mm-wave signal using an E/O intensity modulator 23, which creates RF sidebands on an optical carrier by modulating the phase of the optical carrier with the input RF voltage using the E/O properties of the modulator material, and then converts the phase shift to an intensity modulation by combining the phase-modulated path interferometrically with an non-modulated path. One of the modulated sidebands is filtered using an optical band pass filter 33, which is realized by combining a fiber Bragg grating and circulator. A fiber Bragg grating is a section of optical fiber in which a periodic change in refractive index has been created. This sets up a diffraction grating through which a narrow range of wavelengths are reflected. The optical circulator passes the reflected portion of the spectrum back into the link.

On the lower path, the light is modulated by the local oscillator signal desired for frequency conversion, again using an E/O modulator 24. One of the LO sidebands is filtered using a fiber Bragg grating and circulator 34. The sidebands from the upper and lower paths are combined in a 2×2 optical coupler 35 and sent to a pair of balanced photodetectors 46a-46b. Thus, the LO sideband becomes the phase reference for the signal sideband, and the frequency spacing of these two sidebands determines the frequency of the signal at the detector output. The balanced photodetectors 46a-46b detect the upper and lower signals coming out of the 2×2 optical coupler 35 and subtract them at a coupling (combiner 47) therebetween. Since the signals are out of phase by 180°, the subtraction at the detector results in the addition of the two signals, while any common-mode noise terms are subtracted.

The E/O modulators 23-24 shown in FIG. 2 are Mach-Zehnder intensity modulators, biased at the null point for maximum sideband power. But other types of modulators can be used, including phase modulators. When a phase modulator is used, higher order sidebands can be selected from the lower path in order to achieve higher frequency up- or down-conversion using a lower-frequency RF source as the LO input. For example, an LO input of 10 GHz into a phase modulator produces sidebands at 10 GHz, 20 GHz, 30 GHz, etc., and the 30 GHz upper sideband can be combined with a signal's lower sideband at 5 GHz to produce an up-converted signal at 35 GHz. Or the 30 GHz upper sideband can be combined with a signal's upper sideband at 32 GHz to produce a 2 GHz IF signal.

The performance of the photonic frequency converter may be driven primarily by the optical power input level at the two modulators, the RF power of the LO signal, and the efficiency of the two fiber Bragg grating filters. Due to balanced detection, the noise terms can be divided into two categories: common mode noise terms—which are canceled by the balanced detectors—and non-canceling noise terms. Common mode noise terms include laser relative intensity noise (RIN) from both the signal and LO paths, amplified spontaneous emission (ASE)-ASE beat noise, signal-ASE beat noise, and LO-ASE beat noise. The non-canceling noise terms are thermal noise from matching impedances at the modulator and detector, shot noise from the signal and the LO, beat noise from the signal RIN and the LO RIN, and shot noise from the ASE. Shot noise terms increase linearly with photocurrent, while gain and third order intercept point (OIP3) increase with the square of the photocurrent. This means that optimal performance is achieved when the system is shot noise-limited.

Spur Analysis

One of the advantages of using photonic frequency conversion instead of conventional RF frequency conversion is the mitigation of mixing spurs. The inherent nonlinearities of an RF mixer produce a wide range of spurs from the combination of a signal and a local oscillator. These spurs can be avoided by careful choice of frequency—a narrow instantaneous bandwidth, for example. But for a broadband system they can be severely limiting. RF engineers must typically rely on multi-stage conversions to avoid spurs in a wide-band system.

Figure 12:
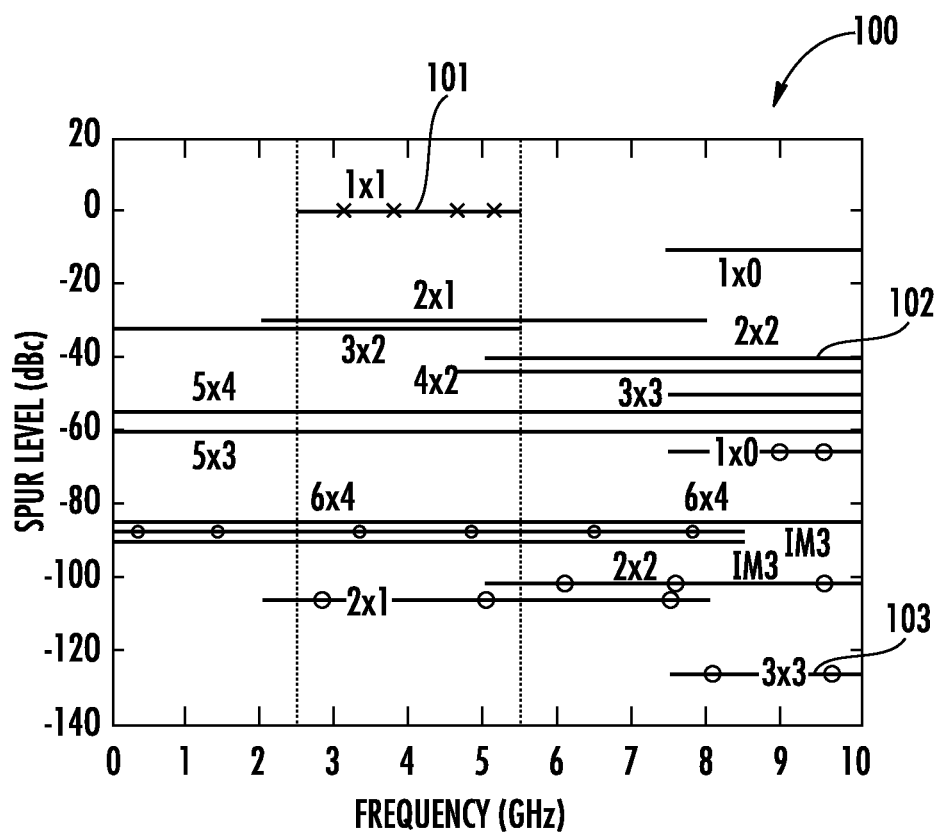
FIG. 12 is a diagram illustrating spur level performance of the example embodiment of the communications device of FIG. 2.

FIG. 12 shows a diagram 100 with the mixing spurs for a typical X-band frequency converter. In this case, the input signal range is 7.5-10.5 GHz, the LO is at 13 GHz, and the IF band is 2.5-5.5 GHz. The mixer data 102 has an OIP3 of 25 dBm and a noise figure of 10 dB, slightly better than the photonic frequency converter disclosed herein. For a signal output level of −20 dBm, the 3rd order intermodulation products (IM3) of both the RF mixer (102) and the photonic frequency converter (103) are shown. Also shown are the dominant mixing spurs that impinge on the IF band data 101.

The photonic frequency converter data 103 also shows mixing spurs, but these are greatly reduced. Most mixing spur products lie far below the noise floor and are not measured. The spurs that remain-1×0 (out of band), 2×1 (in band), 2×2 (partially in band), and 3×3 (out of band)—are substantially lower than those of the RF mixer. More significantly, they are also lower than the IM3 products, showing that the linearity of the photonic frequency converter is indeed 3rd-order limited.

Experimental Results

A. Down-Conversion

Using a standard two-tone RF measurement, an experiment determined the IF conversion gain and OIP3 of the photonic frequency converter at a 100 MHz IF over a range of RF input signals. The results are shown in the diagrams 75, 77 of FIGS. 6-7. In each case, the DC photocurrent through each of the two balanced detectors was 10 mA, corresponding to a shot noise-limited noise floor of −156 dBm/Hz. The IF conversion gain curve 76 decreases with frequency, while the OIP3 remains relatively flat. The gain reduction is related to the frequency dependence of the E/O modulators 23-24 used in the experiment—the driving voltage of the modulators rolls off as frequency increases. The OIP3 curve 78 does not depend on modulator driving voltage, and therefore does not roll off with frequency.

B. Analog-to-Digital Converter (ADC) Performance

An object of this experiment was to show that an optically down-converted IF would provide the signal intelligibility required for successful analog-to-digital conversion, resulting in Spur Free Dynamic Range (SFDR) and Effective Number of Bits (ENOB) measurements close to the ADC's intrinsic performance. An Intersil ISLA112P50 12-bit, 500 Msps ADC was used in this experiment, as available from the Intersil Corporation of Milpitas, Calif. The software platform which accompanied the ADC board was used for measurements, Fast Fourier Transform (FFT) analysis, and implementing the windowing functions necessary to reduce any leakage resulting from the FFT computation. With the aid of a signal generator, the ADC board was characterized along 35 points between 105 MHz to 980 MHz in order to develop a baseline for comparison. To maintain cohesion between the baseline and measured results, all signal inputs were required to achieve a −1.0±0.05 dBFS fundamental level.

A brief discussion of the test setup and components used is now included. The input to the ADC board was the RF signal from the photodetector output. Tunable band-pass filters were used to suppress the majority of the spectral noise which would have contributed to degraded SNR and ENOB performance. Since the input to the ADC board was limited by the output of the photodetector 26, a 20 dB amplifier was used in series to increase the signal level enough to meet the prescribed −1.0±0.05 dBFS requirement for each data point taken. Variable attenuation was used to maintain a permissible balance between the required signal levels and the amplified noise floor being passed in by the filter.

Figure 10:
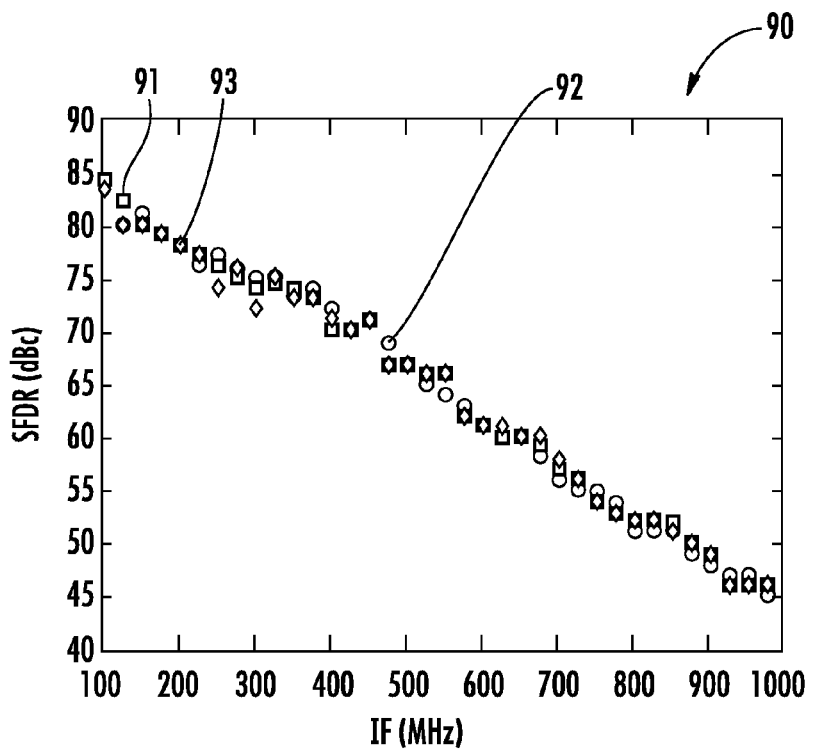
FIG. 10 is another diagram illustrating spurious free dynamic range performance of the example embodiment of the communications device of FIG. 2.
Figure 11:
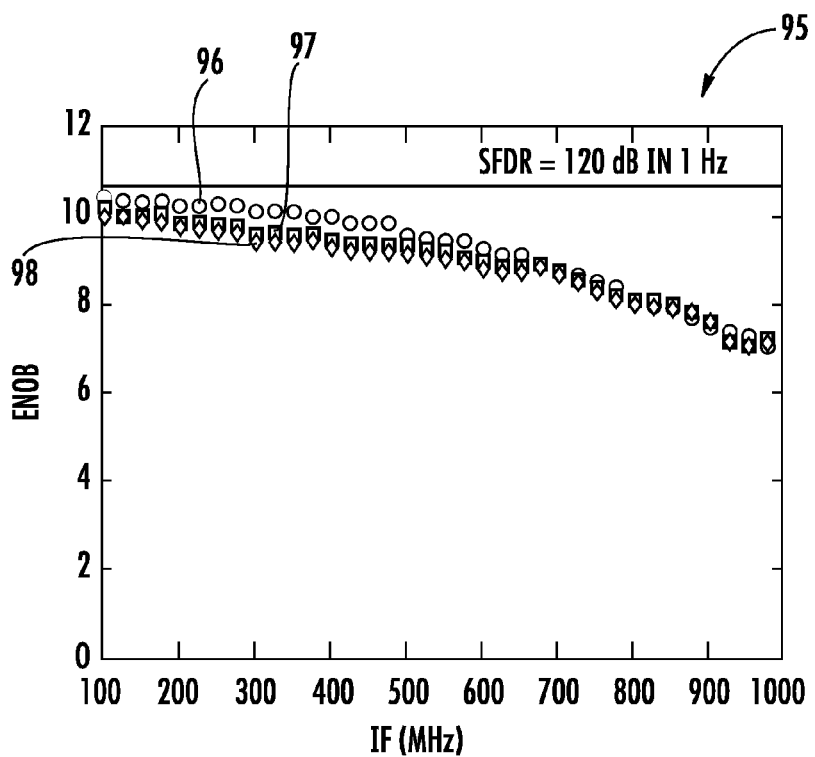
FIG. 11 is a diagram illustrating effective number of bits performance of the example embodiment of the communications device of FIG. 2.

The measured results are shown in FIGS. 10-11, which include diagrams 90 and 95 and compare the intrinsic SFDR and ENOB of the ADC to those of IF signals down-converted from 10 (curves 91, 97) and 20 GHz (curves 93, 98). The SFDR of the downconverted signals matches the ADC baseline measurement curves 92, 96 very well, showing the excellent linearity of the photonic down-conversion method. The ENOB measurement shows some degradation in performance at lower IF values, due to the noise floor increase from the photonic down-converter. Improved filtering is expected to reduce this effect and recover some of the <1 bit reduction. But the performance of the photonic down-converter is very consistent at both 10 and 20 GHz.

C. Up-Conversion

Figure 5:
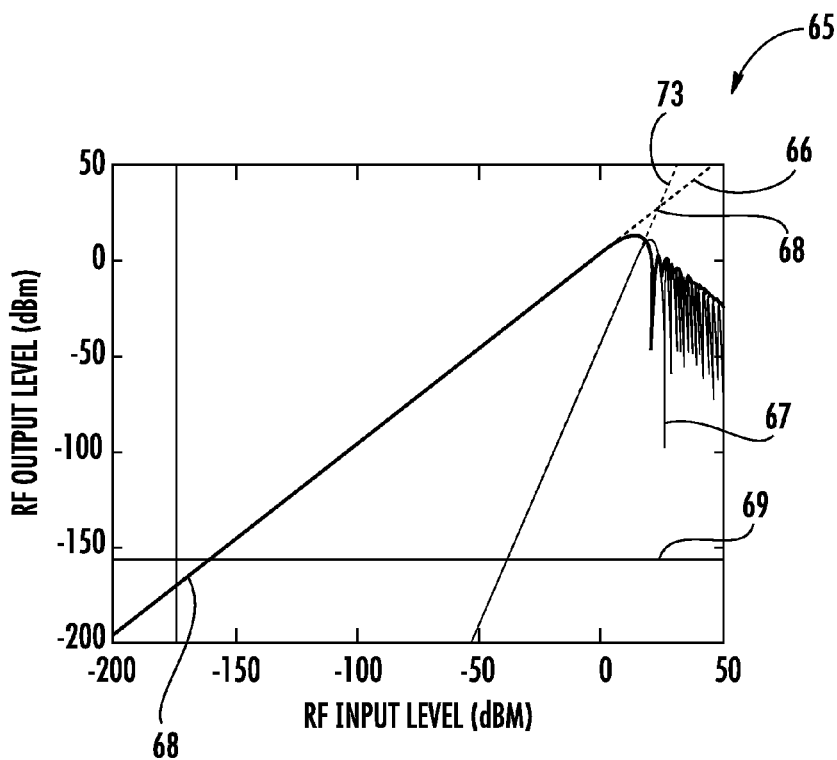
FIG. 5 is a diagram illustrating RF output level performance of the example embodiment of the communications device of FIG. 2.
Figure 6:
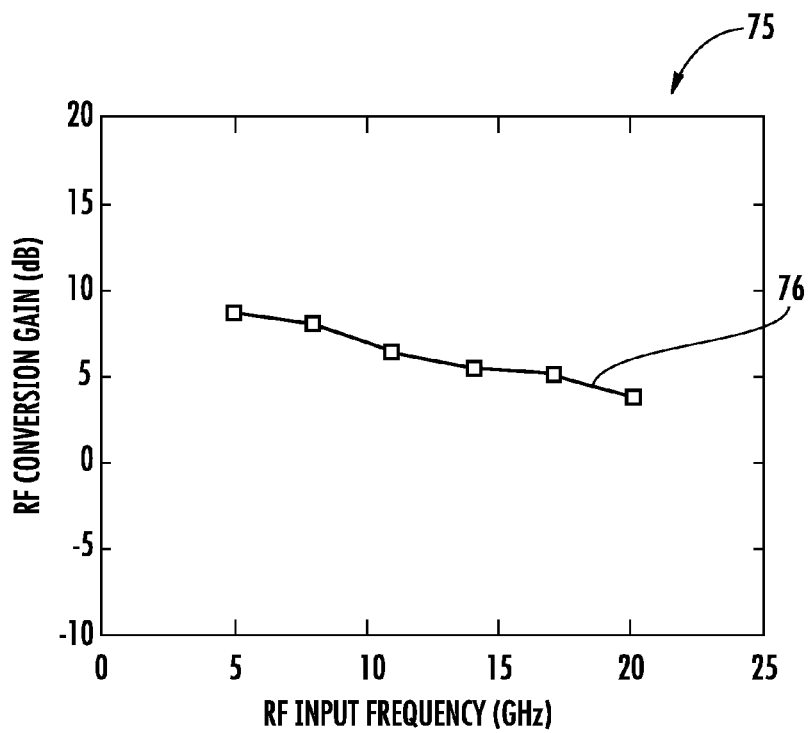
FIG. 6 is a diagram illustrating RF gain performance of the example embodiment of the communications device of FIG. 2.
Figure 7:
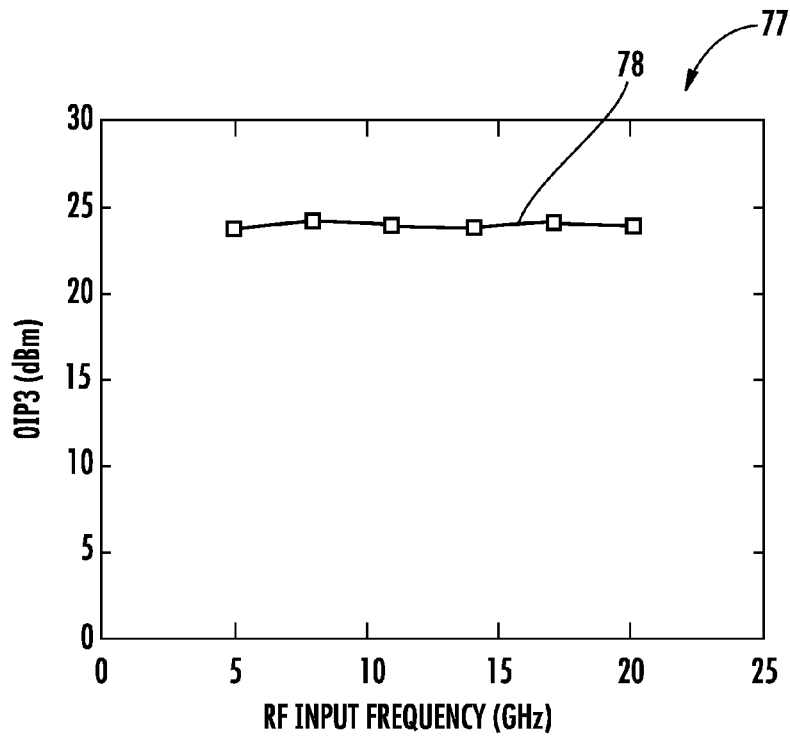
FIG. 7 is a diagram illustrating third order intercept point performance of the example embodiment of the communications device of FIG. 2.

Photonic up-conversion was demonstrated using both a typical dual-laser heterodyne method (curve 61) with an optical phase-locked loop and the single-laser sideband filtered approach described herein (curve 62). The phase noise is shown for both cases in FIG. 4. The OPLL phase noise is limited by such factors as the loop bandwidth of the OPLL and the linewidth of the two lasers. Also included on the plot is the phase noise of the RF synthesizer (curve 63) used to create the LO sideband, showing that the phase noise of the single-laser up-converted signal is limited by the RF synthesizer. E/O oscillators could be used to produce LO sidebands with even greater reductions in phase noise. In FIG. 5, a diagram 65 shows the system characterization and includes a third order intercept point 68, a curve 68 for the RF signal, a curve 66 for the linear signal, a curve 67 for the $3^{rd}$ order inter-modulation distortion (IMD), and a curve 73 for the linear IMD. The diagram 65 also includes a noise floor 69.

Experiment Conclusion

A photonic frequency converter based on optical sideband filtering can be used to produce up- and down-converted signals over a wide range of RF frequencies. The reduction of mixing spurs provides an additional advantage over conventional RF mixers. Down-conversion was demonstrated from 5-20 GHz to a 100 MHz IF with positive gain and high linearity. Direct digitization of downconverted RF signals at 10 and 20 GHz with negligible degradation of ADC performance is provided. The disclosed approach also showed reduced phase noise for an up-converted RF signal. The sideband-filtered method produces a signal with phase noise limited by the LO signal generator.

Supplemental Experimental Results

Figure 8:
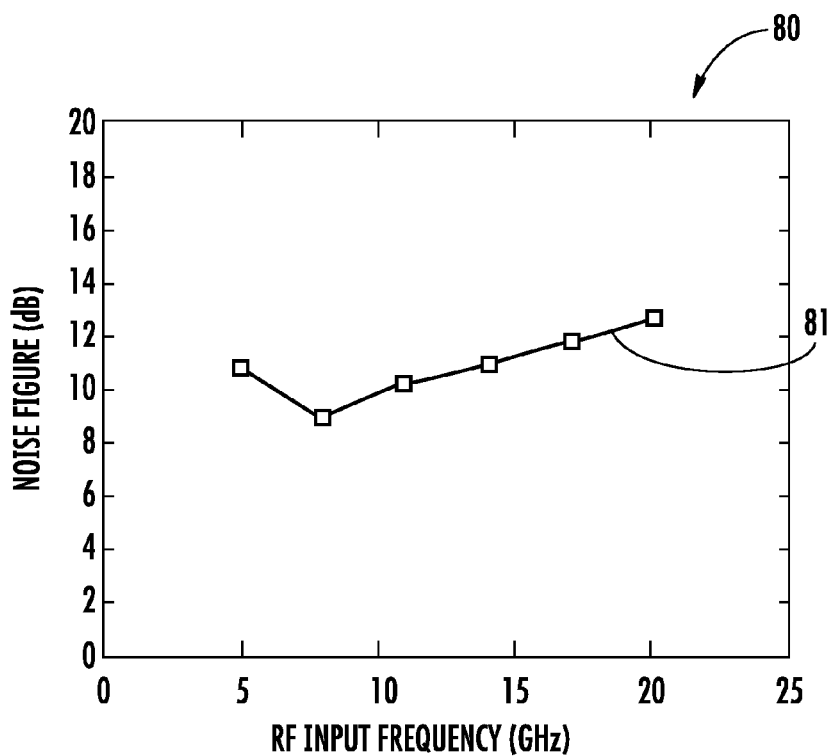
FIG. 8 is a diagram illustrating noise performance of the example embodiment of the communications device of FIG. 2.
Figure 9:
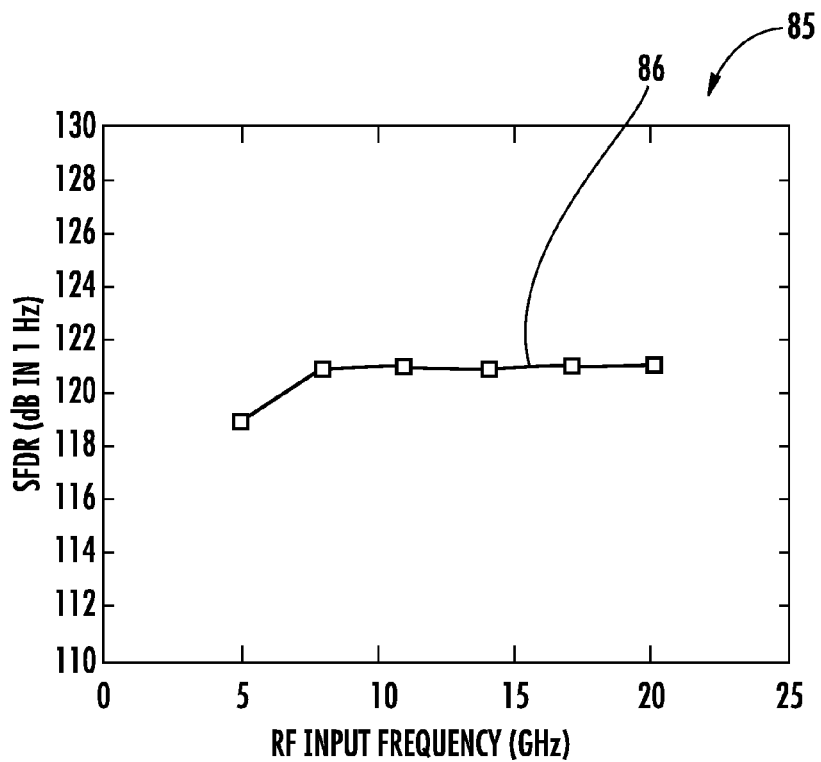
FIG. 9 is a diagram illustrating spurious free dynamic range performance of the example embodiment of the communications device of FIG. 2.

Referring specifically to FIG. 8-9, diagrams 80 and 85 illustrate performance of where the optical power is 5 W, the local oscillator input power is 20 dBm, the DC photocurrent is 20 Ma, and the FBG bandwidth is 5 GHz. Curve 81 shows measured noise floor, and curve 86 shows spurious free dynamic range.

Other features relating to communications devices are disclosed in co-pending application "RF COMMUNICATIONS DEVICE INCLUDING AN OPTICAL LINK AND RELATED DEVICES AND METHODS," application Ser. No. 13/189,727, the contents of which are incorporated herein by reference in its entirety.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications device comprising:
a transmitter device comprising
an optical source configured to generate an optical carrier signal,
a first electro-optic (E/O) modulator coupled to said optical source and configured to modulate the optical carrier signal with an input signal having a first frequency,
a second E/O modulator coupled to said optical source and configured to modulate the optical carrier signal with a reference signal,
a first band pass filter coupled downstream from said first E/O modulator and configured to pass a carrier frequency sideband, and
a second band pass filter coupled downstream from said second E/O modulator;
an optical waveguide coupled to said transmitter device; and
a receiver device coupled to said optical waveguide and comprising an O/E converter coupled to said optical waveguide and configured to generate an output signal comprising a replica of the input signal at a second frequency based upon the reference signal;
said second band pass filter configured to
pass a reference signal frequency sideband at a greater frequency than that of the carrier frequency sideband when the second frequency is greater than the first frequency, and
pass the reference signal frequency sideband at a lesser frequency than that of the carrier frequency sideband when the second frequency is less than the first frequency.

2. The communications device of claim 1 wherein said first and second band pass filters each comprises a fiber Bragg grating.

3. The communications device of claim 1 wherein the first frequency is less than the second frequency.

4. The communications device of claim 1 wherein the first frequency is greater than the second frequency.

5. The communications device of claim 1 wherein said O/E converter comprises:
first and second optical detectors coupled to said optical waveguide; and
a combiner coupled to said first and second optical detectors.

6. The communications device of claim 1 wherein said transmitter device comprises an amplifier coupled between said optical source and said first and second E/O modulators.

7. The communications device of claim 1 wherein said transmitter device comprises a local oscillator configured to generate the reference signal.

8. The communications device of claim 1 wherein said transmitter device further comprises an optical splitter coupled between said optical source and said first and second E/O modulators.

9. The communications device of claim 1 wherein said transmitter device further comprises an antenna coupled to said first E/O modulator.

10. The communications device of claim 1 wherein each of said first and second E/O modulators comprises a Mach-Zehnder modulator.

11. A communications device comprising:
a transmitter device comprising
an optical source configured to generate an optical carrier signal,
a first electro-optic (E/O) modulator coupled to said optical source and configured to modulate the optical carrier signal with an input signal having a first frequency,
an antenna coupled to said first E/O modulator, a first band pass filter coupled downstream from said first E/O modulator and configured to pass a carrier frequency sideband, a second E/O modulator coupled to said optical source and configured to modulate the optical carrier signal with a reference signal, a second band pass filter coupled downstream from said second E/O modulator, and an optical splitter coupled between said optical source and said first and second E/O modulators;

an optical waveguide coupled to said transmitter device; and a receiver device coupled to said optical waveguide and comprising an O/E converter coupled to said optical waveguide and configured to generate an output signal comprising a replica of the input signal at a second frequency based upon the reference signal;

said second band pass filter configured to pass a reference signal frequency sideband at a greater frequency than that of the carrier frequency sideband when the second frequency is greater than the first frequency, and pass the reference signal frequency sideband at a lesser frequency than that of the carrier frequency sideband when the second frequency is less than the first frequency.

12. The communications device of claim 11 wherein said first and second band pass filters each comprises a fiber Bragg grating.

13. The communications device of claim 11 wherein the first frequency is less than the second frequency.

14. The communications device of claim 11 wherein the first frequency is greater than the second frequency.

15. The communications device of claim 11 wherein said O/E converter comprises:

first and second optical detectors coupled to said optical waveguide; and a combiner coupled to said first and second optical detectors.

16. The communications device of claim 11 wherein said transmitter device comprises an amplifier coupled between said optical source and said first and second E/O modulators.

17. A communications method comprising:

generating an optical carrier signal in a transmitter device;

electro-optic (E/O) modulating the optical carrier signal with an input signal having a first frequency in the transmitter device;

E/O modulating the optical carrier signal with a reference signal in the transmitter device;

band pass filtering in the transmitter device to pass a carrier frequency sideband;

generating an electrical output signal comprising a replica of the input signal at a second frequency based upon the reference signal at a receiver device coupled to the transmitter device via an optical waveguide; and band pass filtering in the transmitter device to pass a reference signal frequency sideband at a greater frequency than that of the carrier frequency sideband when the second frequency is greater than the first frequency, and pass the reference signal frequency sideband at a lesser frequency than that of the carrier frequency sideband when the second frequency is less than the first frequency.

18. The method of claim 17 further comprising:

O/E converting with first and second optical detectors coupled to the optical waveguide; and combining outputs from the first and second optical detectors.

19. The method of claim 17 further comprising amplifying the optical carrier signal in the transmitter device.

20. The method of claim 17 further comprising generating the reference signal as a local oscillator signal in the transmitter device.

* * * * *